US008644460B2

(12) United States Patent
Tai et al.

(10) Patent No.: US 8,644,460 B2
(45) Date of Patent: *Feb. 4, 2014

(54) APPLICATION SERVICE INVOCATION

(75) Inventors: Yung-Hwa Tai, Holmdel, NJ (US);
Gregory Welch, Somerset, NJ (US);
James L. Verlare, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 410 days.

This patent is subject to a terminal disclaimer.

(21) Appl. No.: 12/849,622

(22) Filed: Aug. 3, 2010

(65) Prior Publication Data

US 2010/0317334 A1 Dec. 16, 2010

Related U.S. Application Data

(63) Continuation of application No. 11/564,984, filed on Nov. 30, 2006, now Pat. No. 7,792,275, which is a continuation-in-part of application No. 11/460,750, filed on Jul. 28, 2006.

(60) Provisional application No. 60/703,812, filed on Jul. 29, 2005, provisional application No. 60/764,748, filed on Feb. 3, 2006.

(51) Int. Cl.
*H04M 11/00* (2006.01)

(52) U.S. Cl.
USPC ............... 379/88.13; 379/88.17; 379/201.02; 379/265.09

(58) Field of Classification Search
USPC ........... 370/467; 709/224; 379/221.03, 88.13, 379/88.17, 201.02, 265.09; 455/418
See application file for complete search history.

(56) References Cited

U.S. PATENT DOCUMENTS

| 5,689,553 | A | 11/1997 | Ahuja et al. |
| 6,578,076 | B1 | 6/2003 | Putzolu |
| 6,701,160 | B1 | 3/2004 | Pinder et al. |
| 7,079,627 | B2 | 7/2006 | Crago et al. |
| 7,155,248 | B2 | 12/2006 | Idnani |
| 7,209,458 | B2 | 4/2007 | Ahvonen |
| 7,606,902 | B2 | 10/2009 | Rao et al. |
| 2003/0027569 | A1 | 2/2003 | Ejzak |

(Continued)

FOREIGN PATENT DOCUMENTS

| WO | WO 01/74108 | 10/2001 |
| WO | WO 01/78328 | 10/2001 |
| WO | WO 2004/008786 | 1/2004 |

OTHER PUBLICATIONS

"Digital cellular telecommunications system (Phase +2); Universal Mobile Telecommunications System (UMTS); IP Multimedia Subsystem (IMS); Stage 2 (3GPP TS23.228 version 6.10.0 Release 6); ETSI TS 123 228," ETSI Standards Lis Sophia Antipolis Cedex France, vol. 3-SA2, No. V6.10.0, Jun. 1, 2005, pp. 1-181.

(Continued)

*Primary Examiner* — Duc Nguyen
*Assistant Examiner* — Yosef K Laekemariam

(57) ABSTRACT

An Internet Protocol Multimedia Subsystem (IMS) includes a Serving-Call Session Control Function (S-CSCF). The S-CSCF includes a Service Capability Interaction Manager (SCIM) configured to invoke one or more application services in response to a message being received by the S-CSCF.

20 Claims, 7 Drawing Sheets

(56) References Cited

U.S. PATENT DOCUMENTS

| | | |
|---|---|---|
| 2003/0046396 A1 | 3/2003 | Richter |
| 2004/0068574 A1 | 4/2004 | Costa Requena et al. |
| 2004/0148416 A1 | 7/2004 | Aarnos et al. |
| 2004/0190498 A1 | 9/2004 | Kallio et al. |
| 2005/0014483 A1 | 1/2005 | Lagerstrom |
| 2005/0050194 A1* | 3/2005 | Honeisen et al. ............ 709/224 |
| 2005/0064883 A1* | 3/2005 | Heck et al. .................. 455/466 |
| 2005/0177616 A1* | 8/2005 | Addington et al. ........... 709/203 |
| 2005/0213606 A1* | 9/2005 | Huang et al. ................. 370/467 |
| 2006/0104431 A1* | 5/2006 | Emery et al. ............. 379/211.04 |
| 2006/0206504 A1 | 9/2006 | Cai et al. |
| 2006/0253538 A1 | 11/2006 | Jung et al. |
| 2006/0270404 A1* | 11/2006 | Tuohino et al. ............ 455/432.3 |
| 2007/0201452 A1 | 8/2007 | Berna Fornies et al. |

OTHER PUBLICATIONS

3GPP: "3rd Generation Partnership Project; Technical Specification Group Services and System Aspects; Internet Protocol (IP) based IP Multimedia Subsystem (IMS) emergency sessions; (Release 7)," 3GPP Draft, S2-051742-23867-100 RM 3GPP Mobile Competence Centre, 650 Route Des Lucioles, F-06921 Sophia-Antipolis Cedex, France, vol. SA WG2, No. Montreal; Jun. 22, 2005, pp. 1-82.

* cited by examiner

APPLICATION SERVICE INVOCATION

PRIORITY INFORMATION

The present application is a Continuation of U.S. patent application Ser. No. 11/564,984, filed in Nov. 30, 2006, which is a Continuation-in-Part of U.S. patent application Ser. No. 11/460,750, filed Jul. 28, 2006, which claims priority to U.S. Provisional Patent Application No. 60/703,812, filed Jul. 29, 2005, and U.S. Provisional Patent Application No. 60/764,748, filed Feb. 3, 2006. The contents of all of these applications are incorporated herein by reference in their entireties.

BACKGROUND INFORMATION

The Internet Protocol Multimedia Subsystem (IMS) provides mobile and fixed multimedia services. The aim of IMS is not only to provide new services, but also all of the services, current and future, that the Internet provides. In this way, IMS gives network operators and service providers the ability to control and charge for each service. In addition, users are given the ability to execute services from their home networks, as well as when the users are roaming.

DETAILED DESCRIPTION OF PREFERRED EMBODIMENTS

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations described herein relate to placing a Service Capability Interaction Manager (SCIM) within an S-CSCF of an IMS.

Figure 1:
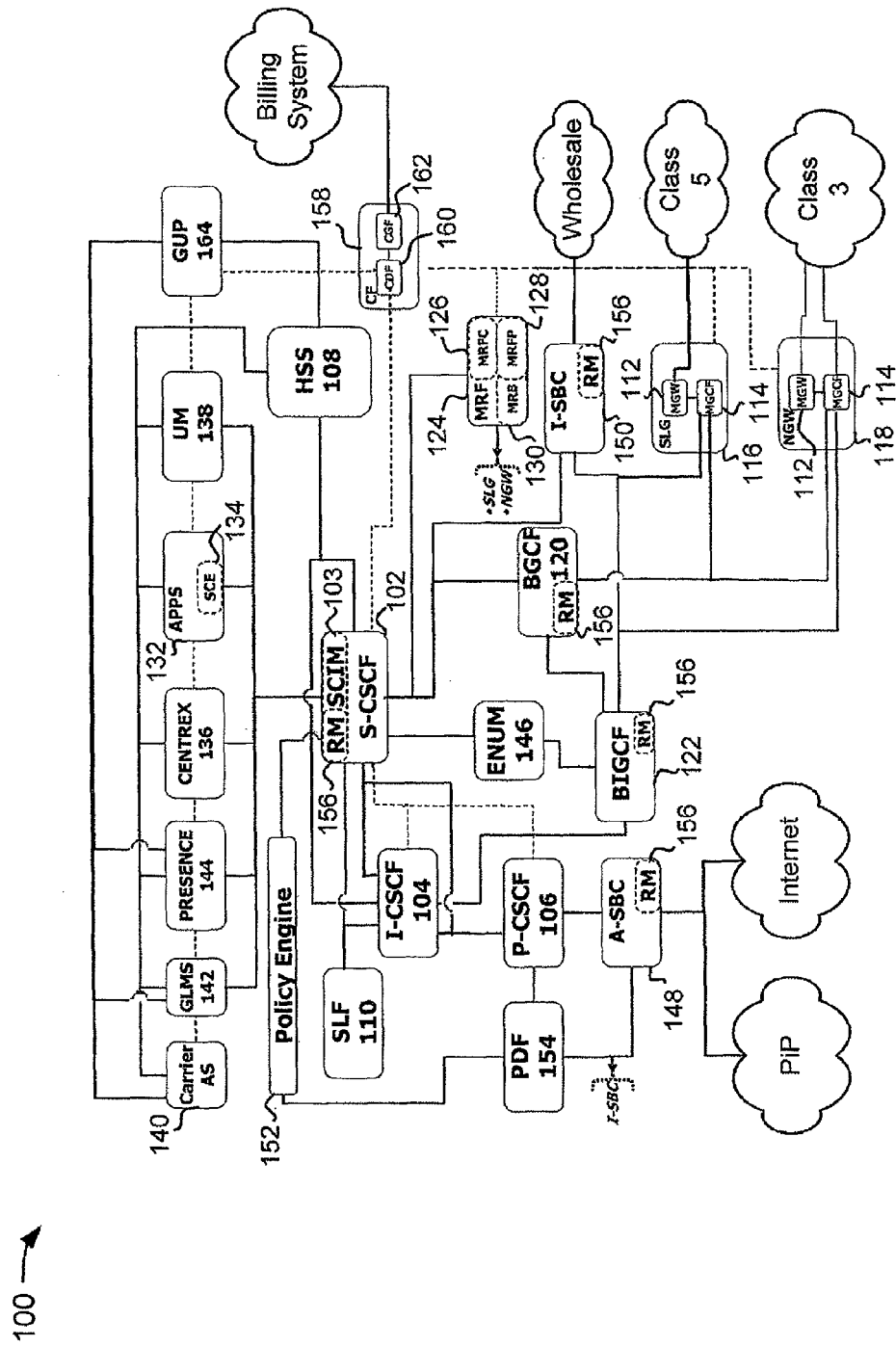
FIG. 1 illustrates an exemplary system in which systems and methods, consistent with exemplary embodiments, may be implemented.

FIG. 1 illustrates an exemplary system 100 in which systems and methods, consistent with exemplary embodiments, may be implemented. As illustrated, system 100 may include a S-CSCF 102, a SCIM 103, an Interrogating-Call Session Control Function (I-CSCF) 104, a Proxy-Call Session Control Function (P-CSCF) 106, a Home Subscriber Server (HSS) 108, a Subscription Location Function (SLF) 110, two Media Gateway (MGW) functions 112, two Media Gateway Control Functions (MGCFs) 114, a Shared Local Gateway (SLG) 116, a Network Gateway (NGW) 118, a Breakout Gateway Control Function (BGCF) 120, a Break In Gateway Control Function (BIGCF) 122, a Multimedia Resource Function (MRF) 124 that may include a Multimedia Resource Function Controller (MRFC) 126, a Multimedia Resource Function Processor (MRFP) 128, and a Media Resource Broker (MRB) 130, one or more application servers 132, Services Creation Environment (SCE) logic 134, a Central Office Exchange Service (CENTREX) 136, a Unified Messaging service (UM) 138, a carrier Application Service (AS) 140, a Group List Management Server (GLMS) 142, a presence service 144, a telephone number mapping (ENUM) server 146, an Access-Session Border Controller (A-SBC) 148, an Interconnection-Session Border Controller (I-SBC) 150, a policy engine 152, a Policy Decision Function (PDF) 154, a Resource Management function (RM) 156, a Charging Function (CF) 158, a Charging Data Function (CDF) 160, a Charging Gateway Function (CGF) 162, and a Generic User Profile (GUP) 164. Although not specifically depicted in FIG. 1, the IMS core may include, for example, S-CSCF 102, I-CSCF 104, P-CSCF 106, and HSS 108. The number of components illustrated in FIG. 1 is provided for simplicity. In practice, a typical system could include more or fewer components than illustrated in FIG. 1. Moreover, it will be appreciated that the IMS standards are continually evolving. Implementations described herein are equally applicable to current and future IMS standards.

S-CSCF 102, I-CSCF 104, and P-CSCF 106 may be considered call session control components in system 100. The call session control components may be responsible for parsing a session (e.g., a session initiation protocol (SIP) session) and applying logic (e.g., business logic, service logic, operational logic, etc.) on a per event basis. The outcome of the session control may be to route an event to the appropriate components and/or append SIP headers and values.

S-CSCF 102 may be viewed as the brains of the IMS core. S-CSCF 102 may perform session control, registration, and service invocation for the subscribers of the IMS core. Hence, S-CSCF 102 may be viewed as the run-time engine, deciding to whom and under what conditions specific services (in the form of Application Servers) are accessed by a SIP request. S-CSCF 102 may receive subscriber profiles from HSS 108 (at registration time or later for unregistered users) to learn the subscribers chosen services and the rules under which the services should be brokered. Additionally, S-CSCF 102 may perform user authentication based on information from HSS 108. S-CSCF 102 may receive session requests from, for example, P-CSCF 106 or I-CSCF 104. After service invocation is completed, S-CSCF 102 may disposition the sessions by routing the session requests to the destinations via, for example, P-CSCF 106, BGCF 120, and/or I-SBC 150.

As illustrated, S-CSCF 102 may include a SCIM 103 and a Resource Management (RM) function 156. SCIM 103 may be considered as an extension of S-CSCF 102, responsible for orchestrating the offerings of one or more application services across various service enabling technologies and platforms to produce valued services for IMS users. As such, SCIM 103 may be viewed as an adjunct IMS platform function that also orchestrates service invocation at session setup, modify, or teardown. Accordingly, SCIM 103 may also be based on a subscriber's profile and predefined interaction rules to determine which services are to be invoked at run time and what type of application and/or media capabilities should be engaged in order to properly execute the services. SCIM 103 may allow for more complex rules to be used for services determination based on the subscriber's profile and, for example, on external information, such as policy information, location information, presence information, the readiness condition of an application server (e.g., load balancing information, network outage information, application server status information, resource availability information, etc.), etc. In one implementation, S-CSCF 102/SCIM 103 may use a complex set of rules for invoking services during call (or session) establishment and/or during an on-going call (or session), as described in greater detail in U.S. patent application Ser. No. 11/612,681, filed Dec. 19, 2006 and entitled "APPLICATION SERVICE INVOCATION BASED ON FILTER CRITERIA," the entire contents of which are incorporated by reference herein.

RM 156, as will be discussed in further detail below, may be responsible for executing business rules and service level agreements (SLAs) by allocating the appropriate resources.

I-CSCF 104 may act as the main point of contact for connections to and from a subscriber in the IMS platform. I-CSCF 104 may be located at the edge of the IMS core. I-CSCF 104 may receive SIP messages and identify the next hops for the SIP messages. To achieve this, I-CSCF 104 may query HSS 108 for the location (e.g., an address) of the appropriate S-CSCF to which a particular SIP message is to be forwarded.

P-CSCF 106 may receive session requests from end points located at both public IP networks and private IP networks. P-CSCF 106 may validate requests, forward the requests to selected destinations, and process and forward the responses. P-CSCF 106 may generate chargeable events and send information relating to the chargeable events to CF 158. Additionally, P-CSCF 106 may interact with PDF 154 to grant, reject, or downgrade a session request based on platform resources and quality of service (QoS) measurements.

HSS 108 may include one or more servers that act as the central repository for user-related information. HSS 108 may contain user-related subscription information for handling multimedia sessions. Some of the information contained in HSS 108 may include information identifying the location of a particular S-CSCF 102 for a particular user. As indicated above, the location of a particular S-CSCF 102 may be conveyed to I-CSCF 104 upon receiving a query from a network element. HSS 108 may also include subscriber profile information that contains service trigger points and information for identifying the corresponding resources (e.g., applications, media, services, etc.) that offer the services. The subscriber profile information may be forwarded to S-CSCF 102 for session control and service treatment. Moreover, HSS 108 may provide and receive updates directly from application servers 132.

SLF 110 may include one or more databases that contain subscription location information for subscribers. SLF 110 may receive a query, which may contain identification information for a subscriber, from I-CSCF 104 and may return, based on the subscriber identification information, information identifying an HSS 108 that serves the subscriber.

System 100 may include various components that bridge the IMS core to external networks, such as a public switched telephone network (PSTN), the Internet, etc. These components, which may include MGW function 112, MGCF 114, SLG 116, NGW 118, BGCF 120, and BIGCF 122, may perform protocol conversion and event routing to or from the IMS core. In one implementation consistent with principles of the invention, SLG 116 and NGW 118 may be replaced with more generic gateways that include MGW 112 and MGCF 114.

MGW function 112 may connect PSTN networks and the IMS core. In one implementation, MGW function 112 may terminate bearer channels from a PSTN network and media streams from the IMS core (e.g., real-time transport protocol (RTP) streams in an IP network or Asynchronous Transfer Mode (ATM) Adaptation Layer 2 (AAL2)/ATM connections in an ATM backbone), execute the conversion between these terminations, and perform transcoding and signal processing. In addition, MGW function 112 may provide tones and announcements to circuit switched (CS) users. In one implementation consistent with exemplary embodiments, MGW function 112 may operate under the control of MGCF 114.

MGCF 114 may be part of the gateway infrastructure that enables communication between the IMS core and PSTN networks. MGCF 114 may contain signaling gateway functions that perform protocol conversion between the Integrated Services Digital Network (ISDN) User Part (ISUP) or Primary Rate Interface (PRI) and SIP protocols before forwarding a session to the IMS core. In a similar fashion, IMS-originated sessions directed towards PSTN users may traverse MGCF 114. MGCF 114 may use media gateway control protocols control media channels in MGW 112. In addition, MGCF 114 may report account information to CF 158.

SLG 116 may include a set of MGCF 114 and MGW 112 entities. SLG 116 may connect the IMS core to Class 5 networks. In one implementation, the interfaces between SLG 116 and the Class 5 networks may include Digital Signal 1 (DS1)-based Non-Facilities Associated Signaling (NFAS) PRIs.

NGW 118 may include a set of MGCF 114 and MGW 112 entities. NGW 118 may connect the IMS core to Class 3 networks. In one implementation, the interfaces between MGCF 114 of NGW 118 and the Class 3 networks may include DS1-based signaling system 7 (SS7) interfaces and the interfaces between MGW 112 of NGW 118 and Class 3 networks may include DS1-bearer channels.

BGCF 120 may connect IMS-initiated calls to Circuit Switch (CS) customers (e.g., an IMS subscriber calling a telephone number in the PSTN). BGCF 120 may, based on a routing policy, select an appropriate network in which the connection is to be made or may select the appropriate gateway to the other network.

BIGCF 122 may correspond to an ingress point that handles incoming calls from PSTN gateways (e.g., NGW 118, SLG 116), wholesale gateways, other IP-based carriers (e.g., based on Voice over Internet Protocol (VoIP) peering agreements), Emergency Services Peering Points, etc. BIGCF 122 may route calls from and to non-IMS subscribers. BIGCF 122 may route calls to the IMS core, when the calls are destined for IMS subscribers or when IMS applications are invoked, or may bypass the IMS core elements (P-CSCF 106, I-CSCF 104, S-CSCF 102, HSS 108, etc.) when calls are destined for non-IMS subscribers and no IMS applications are invoked by the calling party or called party. BIGCF 122 may route calls to PSTN-based termination points to BGCF 120 and route calls to IP-based termination points (e.g., a wholesale termination point, IP-based carriers, etc.) directly to I-SBCs 150 associated with the IP-based termination points. If calls are either from and/or to IMS subscribers or IMS applications (or services) are invoked, BIGCF 122 may route the calls to the IMS core via I-CSCF 104 and using S-CSCF 102 to invoke calling and/or called party features.

The IMS core may provide multimedia services. Examples of multimedia services (or applications) include playing announcements, audio/video recording and playback, interactive voice response (IVR), fax reception and transmission, automatic speech recognition (ASR), text-to-speech conversion (TTS), multimedia conferencing, customized ring back tones, push-to-talk over cellular (PoC), video messaging, etc. MRF 124 may be part of the IMS core and may support services that use multimedia streams.

As illustrated in FIG. 1, MRF 124 may include MRFC 126, MRFP 128, and MRB 130. MRFC 126 and MRFP 128 are the IMS resources that provide support for bearer-related services (e.g., multi-party sessions, announcements to a user, bearer transcoding, etc.). MRFC 126 may provide bearer control-related services. MRFP 128 may provide user plane resources that may be requested and instructed by MRFC 126. MRB 130 may provide a resource management function that is able to allow media resources to become common resources shared among multiple applications.

Application servers 132 may include one or more servers that provide enhanced audio, video, messaging, and data services within the application layer of system 100. Application servers 132 may be accessible to the users of the IMS core and provide value-added multimedia services to those users. Application servers 132 may submit charges to the IMS core for the services that application servers 132 provide to the IMS user community.

Two types of application servers that may be used within system 100 may include macro applications (or macro application services) and micro applications (or micro application services). Macro applications may include standalone application servers that typically contain support functions (e.g., registration, media resource, etc.).

Each of the macro applications may correspond directly to a service and a trigger in a subscriber's profile. S-CSCF 102 may detect the trigger point of a macro application and invoke the macro application via the S-CSCF/SCIM functionality. The S-CSCF 102/SCIM 103 may manage interactions among the intact macro applications and the composite services constituted by multiple micro applications (described in greater detail below)—or a combination of one-to-many macro and one-to-many micro applications.

Examples of macro application services may include Hosted IP CENTREX (HIPC) 136, Unified Messaging (UM) 138, GLMS 142, and Presence service 144. CENTREX 136 may correspond to a type of Private Branch Exchange (PBX) service in which switching occurs at a local telephone office instead of at the company premises where the traditional PBX is located (which may be referred to as Customer Premise Equipment (CPE)). In one implementation, CENTREX 136 may be replaced by or supplemented with a SIP Voice Features server. Unified messaging 138 may allow users to retrieve and send voice messages from a single interface, regardless of the technology (e.g., telephone, personal computer, etc.) and may provide other unified messaging services (e.g., fax deposit retrieval, voice to email, etc.).

Micro applications may be provided on one or more Services Creation Environment (SCE) with service execution capability formulating SIP Application Servers. Micro applications may include a wide variety of enhanced multimedia services that allow for a rapid development and deployment cycle. Multiple micro applications may be assembled into a composite service. This composite service, in the same manner as the macro applications, may be represented by a trigger in a subscriber's profile. S-CSCF 102 may detect the trigger point of a composite service and invoke the composite service via SCIM 103 functionality.

SCIM 103 may also play a role in managing interactions among the micro applications when such a composite service is invoked. SCIM 103 may apply the following processes in managing the interactions among micro applications: sequences the micro applications invocation based on pre-defined priority; detects mid-call triggers and determines the subsequent micro application invocation accordingly; resolves service conflicts based on the predefined interaction rules; and/or applies default handling in exception cases.

These processes may be similar to what S-CSCF 102 applies on macro applications. However, micro applications have a stronger disproportionate reliance on the richer SCIM functionality, in comparison to macro services. For example, if a Location Service is blended with a CENTREX service, most of the session control may reside within the CENTREX service. Comparatively, if micro applications, such as Find-Me, Do-Not-Disturb, voicemail, and a Location service (all as micro services), are blended, then there may be a disproportionately higher reliance on session control from SCIM 103. That is, SCIM 103 may be used to handle mid-call triggers, fully manage exception cases, etc. Accordingly, the need for robust orchestration may be significantly higher in an environment where there is significant service decomposition (micro services).

One example of a micro application is the Carrier AS 140. Carrier AS 140 may facilitate feature rich tool free call processing. Other examples of micro applications may include, as indicated above, a Find-Me service, a Do-Not-Disturb service, a voicemail service, a location service, etc.

SCE logic 134 may provide a foundation for rapid development of next generation services. SCE 134 may support Java Specification Request (JSR) 116 SIP Servlet and a suite of externalized application programming interfaces (APIs) for developers to gain access to the IMS core. A single SCE 134 may contain basic service capabilities support a number of macro application servers and may support the building of micro applications.

The IMS core may support a number of different services, such as GLMS 142, Presence service 144, and ENUM server 146. GLMS 142 may include one or more services that allow for group list creation, management, and use across multiple applications within the IMS core. GLMS 142 may enforce access and visibility rules. Presence service 144 may include one or more services that automate the task of aggregating both presence and availability information. Presence service 144 may inform one user about the status of another user's availability and willingness to communicate. Presence service 144 may use a Presence User Agent (PUA) to manage the presence of the IMS subscribers and handle presence subscription requests. For example, an application or an IMS subscriber may act as a watcher, which is an entity that subscribes to presence information provided by Presence service 144. ENUM server 146 may provide translation of E.164 to SIP URIs. BIGCF 122 and S-CSCF 102 may query ENUM server 146 to determine a next hop for a call. In some implementations consistent with exemplary embodiments, BIGCF 122 may execute ENUM queries for both calling and called number resolution. Additional information regarding ENUM server 146 may be found in co-pending U.S. patent application Ser. No. 11/460,668, filed Jul. 28, 2006, and entitled "ROUTING CALLS IN A NETWORK," which is incorporated by reference herein in its entirety.

The IMS core may include one or more session border controllers (SBCs) that provide control of the boundary between different service provider networks, provide signaling protocol inter-working between the SIP-based IMS core and other service provider networks, control the transport boundary between service provider networks, and provide usage metering and Quality of Service (QoS) measurements for media flows. Two types of SBCs that may be associated with the IMS core are the A-SBC 148 and the I-SBC 150. In other implementations, A-SBC 148 and I-SBC 150 may be replaced with border control and border gateway functions.

A-SBC 148 may correspond to an ingress point to the IMS core for Customer Premises Equipment (CPE) traffic. A-SBC 148 may provide SIP aware firewall capabilities that support network address translation (NAT), prevent denial of service (DoS) attacks, and execute other security enforcement features. A-SBC 148 may be the first SIP events normalization point prior to the IMS core.

I-SBC 150 may serve as a connection point between the IMS core and wholesale gateways and also between the IMS core and IP peering VoIP carriers. I-SBC 150 may provide SIP normalization and Topology Hiding and Internetwork Gateway (THIG) services.

System 100 may include a number of policy components. For example, system 100 may, as illustrated in FIG. 1, include policy engine 152, PDF 154, and RM 156. Policy engine 152 may include one or more rule-based engines that govern subscriber access to the IMS core, subscriber access to resources, and routing decisions for several different types of event requests made within the IMS core. In one implementation, policy engine 152 may provide decision logic to policy components (also called "policy decision points") within the IMS core. Policy engine 152 may manage two general categories of resources: 1) network bandwidth resources related to the transport of multimedia content streams, and 2) application resources related to the service logic and media processing used to initiate and control multimedia content streams. Policy engine 152 may maintain real time information regarding the state of all resource requests (e.g., bandwidth requests, media requests, etc.) being made in system 100 and update the appropriate policy components (e.g., PDF 154 and/or RM 156) in system 100 based on the real time information. Moreover, policy engine 152 may allow for policies to be created, modified, and/or deleted and may update the appropriate policy components (e.g., PDF 154 and/or RM 156) in real time to reflect the policy changes. Policy engine 152 may interface with PDF 154 and RM 156 using the extensible markup language (XML) protocol. Policy engine 152 may also interface with one or more external operations support systems (OSSs) (not shown) for policy creation, modification, and/or deletion and with one or more network management systems for obtaining resource status updates. Additional information regarding policy engine 152 may be found in co-pending U.S. patent application Ser. No. 11/460,672, filed Jul. 28, 2006, and entitled "POLICY ENGINE," which is incorporated by reference herein in its entirety.

PDF 154 may provide service-based local policy control. PDF 154 may make policy decisions based on session and media-related information. PDF 154 may exchange this decision information with another IMS element (such as A-SBC 148 or I-SBC 150) to control the flow and characteristics of a communication link. PDF 154 may manage the bandwidth resources. PDF 154 may act as a sub-component of the platform border signaling elements (P-CSCF 106, BIGCF 122, BGCF 120, and SBCs 148 and 150) and may enforce policies to ensure that multimedia streams are transported with the proper bandwidth utilization properties and Quality of Service (QoS) in accordance with subscriber service level agreements (SLAs).

RM 156 may be used to execute a policy at the component level. As illustrated in FIG. 1, RM 156 may be associated with, for example, S-CSCF 102, BGCF 120, BIGCF 122, A-SBC 148, and I-SBC 150. In one implementation, RM 156 may store and execute the policy decisions that are relevant for the location at which RM 156 is associated.

CF 158 may include a unified system for providing both offline charging and online charging. Offline charging is a process where charging information for network resource usage is collected concurrently with that resource usage. The charging information may be passed through a chain of CFs 158. At the end of this process, Charging Detail Record (CDR) files may be generated by the network, which are then transferred to the network operator's billing domain for the purpose of subscriber billing.

Online charging is a process where the actual charging for network resource usage occurs in real time concurrently with that resource use. The charges may be debited from an appropriately funded subscriber account. An example of online charging includes pre-paid calling card usage.

CDF 160 may compile chargeable events gathered from IMS components into a single Charging Detail Record (CDR) for offline billing activities. CDF 160 may gather the chargeable events from a Charging Trigger Function (CTF) that may be associated with components of system 100 and, after creating the CDR, pass the billing data to the CGF 162.

CGF 162 may act as a gateway between both the offline charging system, the online system, and an external post-processing system, such as a billing domain.

GUP 164 may include a collection of data that is stored and managed by different entities, such as the user equipment, the home environment, the visited network, and the value-added service providers, which may affect the way in which an individual user experiences services. GUP 164 may include a number of user profile components, and an individual service may make use of a subset of the available user profile components.

Figure 2:
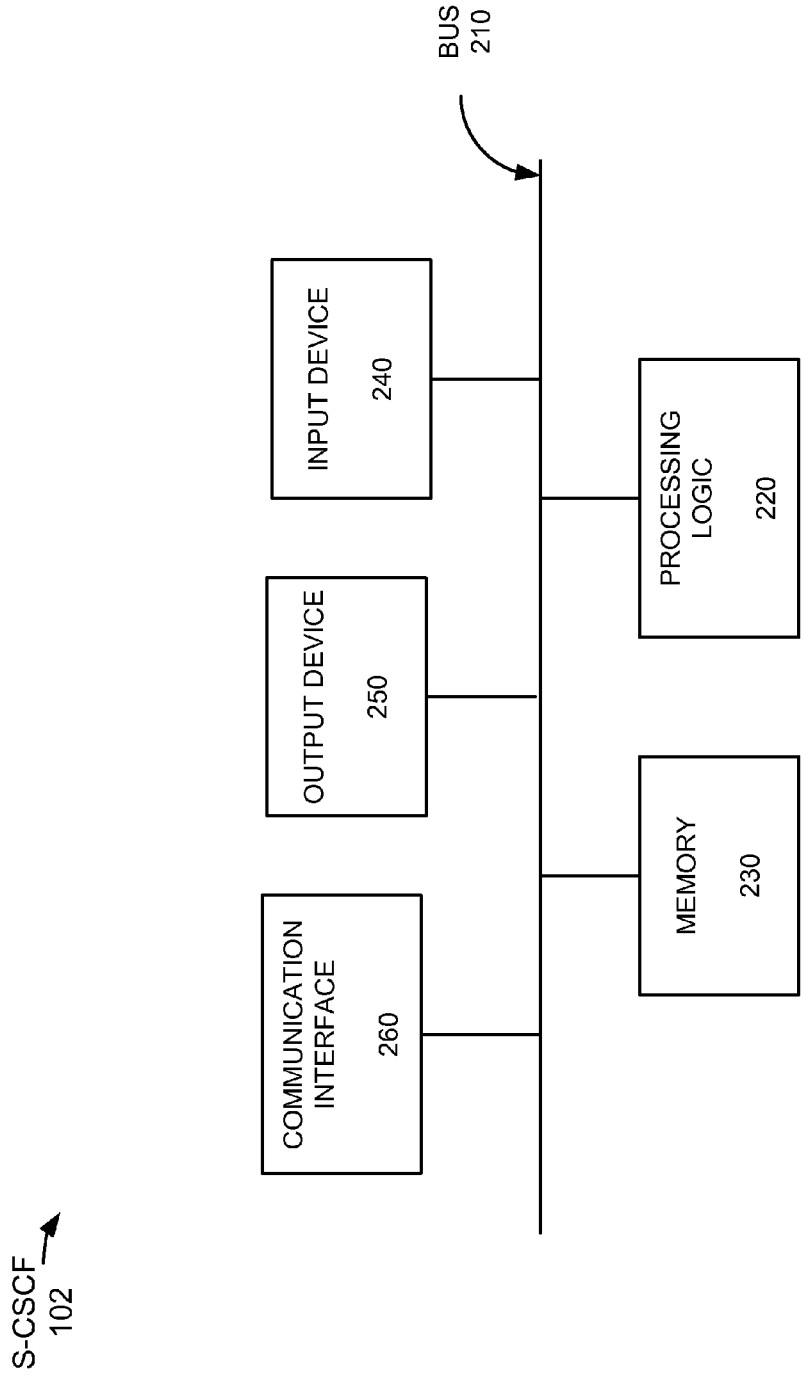
FIG. 2 illustrates an exemplary configuration of the Serving-Call Session Control Function (S-CSCF) of FIG. 1.

FIG. 2 illustrates an exemplary configuration of S-CSCF 102. As illustrated, S-CSCF 102 may include a bus 210, processing logic 220, a memory 230, an input device 240, an output device 250, and a communication interface 260. It will be appreciated that S-CSCF 102 may include other components (not shown) that aid in receiving, transmitting, and/or processing data. Moreover, it will be appreciated that other configurations are possible.

Bus 210 may permit communication among the components of S-CSCF 102. Processing logic 220 may include any type of processor or microprocessor that interprets and executes instructions. In other implementations, processing logic 220 may be implemented as or include an application specific integrated circuit (ASIC), field programmable gate array (FPGA), or the like. Memory 230 may include a random access memory (RAM) or another type of dynamic storage device that stores information and instructions for execution by processing logic 220, a read only memory (ROM) or another type of static storage device that stores static information and instructions for the processing logic 220, and/or some other type of magnetic or optical recording medium and its corresponding drive for storing information and/or instructions.

Input device 240 may include a device that permits an operator to input information to S-CSCF 102, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables S-CSCF 102 to communicate with other devices and/or systems. For example, communication interface 260 may include mechanisms for communicating with other components within system 100.

As described in greater detail below, S-CSCF 102 may perform processing associated with invoking services in an IMS environment. S-CSCF 102 may perform these and other functions in response to processing logic 220 executing software instructions contained in a computer-readable medium, such as memory 230. A computer-readable medium may be defined as one or more memory devices and/or carrier waves. The software instructions may be read into memory 230 from another computer-readable medium or from another device via communication interface 260. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods consistent with exemplary embodiments are not limited to any specific combination of hardware circuitry and software.

Figure 3:
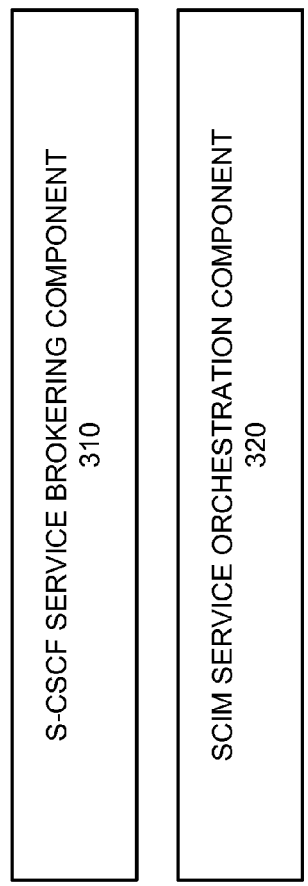
FIG. 3 illustrates an exemplary functional block diagram of a portion of the S-CSCF of FIG. 1.

FIG. 3 illustrates an exemplary functional block diagram of a portion of S-CSCF 102 in an exemplary implementation. As illustrated, S-CSCF 102 may include an S-CSCF service brokering component 310 and a SCIM service orchestration component 320. In other implementations, S-CSCF 102 may include other functional components not illustrated in FIG. 3 that aid in processing call requests.

S-CSCF service brokering component 310 may receive a message (e.g., a SIP message), parse the message, and apply brokering rules to determine to which application server(s) the message should be sent. The message may include, for example, a SIP INVITE message. S-CSCF service brokering component 310 may parse the message to identify the calling party and called party. S-CSCF service brokering component 310 may separately process the service invocation for the calling party and the called party. Depending on the stage of session processing, S-CSCF service brokering component 310 may use the calling party identity or the called party identity to lookup a subscriber profile for orchestrating the calling party services or the called party services. S-CSCF service brokering component 310 may identify the type and capability of application servers based on brokering rules in the subscriber profile(s). S-CSCF service brokering component 310 may query the RM to obtain actual application resources or media resources and send the message to these resources for service invocation.

SCIM service orchestration component 320 may identify one or more micro applications based on a more complex set of brokering rules in the subscriber profile(s). In some implementations, SCIM service orchestration component 320 may also make micro application selections based upon external information, such as information from policy service(s), location services, and/or presence locations, information regarding the readiness condition of an application server (e.g., load balancing information, network outage information, the current state of an application server, resource availability information, etc.), etc.

SCIM service orchestration component 320 may also manage the interaction among micro applications. SCIM service orchestration component 320 may sequence micro application invocations based on predefined priority in the subscriber profile(s). SCIM service orchestration component 320 may detect triggers during an ongoing call and invoke the appropriate micro application(s). SCIM service orchestration component 320 may resolve service conflicts based on predefined interaction rules and may apply default handling in exception cases.

Figure 4:
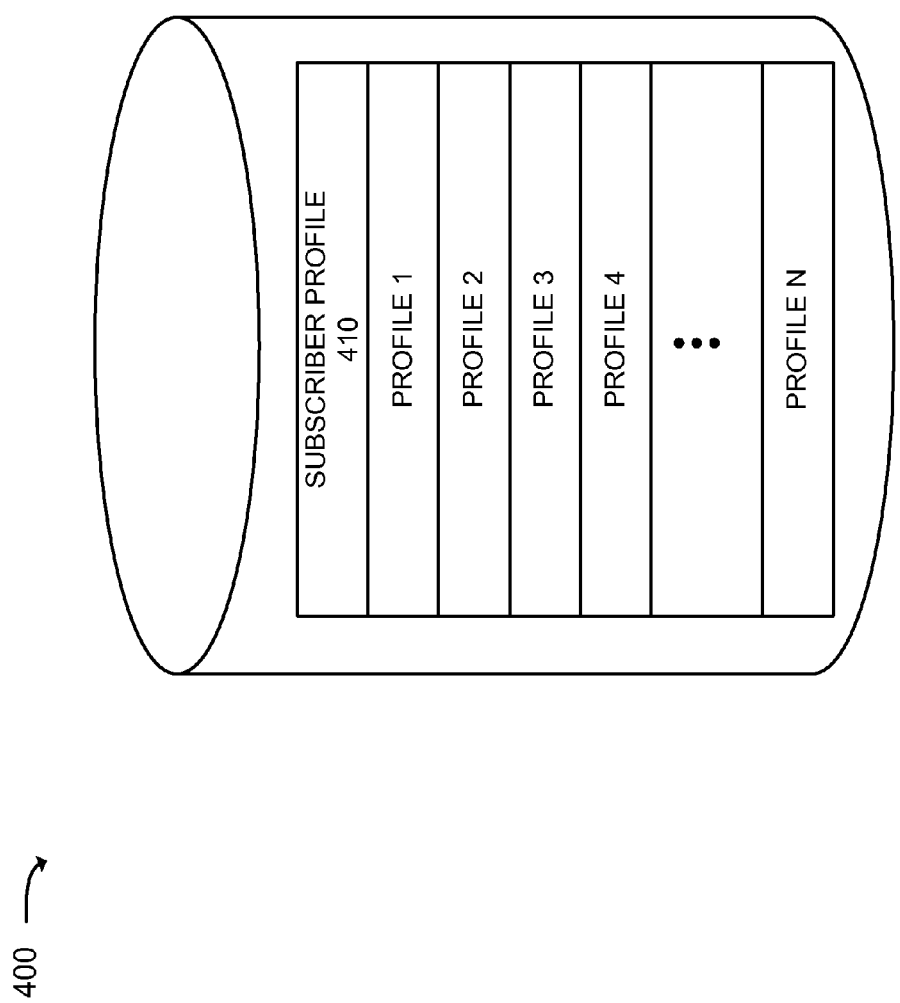
FIG. 4 illustrates an exemplary database that may be associated with the S-CSCF of FIG. 1.

FIG. 4 is a diagram of an exemplary database 400 that may be associated with S-CSCF 102 in an exemplary implementation. While only one database is described below, it will be appreciated that S-CSCF 102 may be associated with additional databases stored locally at S-CSCF 102, such as in memory 230, or distributed throughout system 100.

As illustrated, database 400 may include a subscriber profile field 410. Database 400 may include other fields that facilitate identifying one or more subscriber profiles for a received message.

Subscriber profile field 410 may store profiles for registered subscribers with which the particular S-CSCF 102 is associated. Each subscriber profile may include specific data about the subscriber, such as IMS subscription data to correlate private and public identifiers, the specific S-CSCF 102 where the user is registered, authentication password(s), and a service profile for the subscriber. In other implementations, subscriber profiles may include other information.

The service profile may include one or more service profile elements. The service profile elements may include, for example, S-CSCF capabilities, Trigger Points (TP), and Filter Criteria (also called rules) that may be used to determine the logic to be executed when a Trigger Point is detected and any "services chaining" for the orderly management of multiple services.

Trigger Points (TPs) may include Boolean operations applied on Service Point Triggers (SPTs). As an example, the SPT could be a SIP method "INVITE," and a string (17323351127) in the "RURI" or "From." The TP may use the "AND" operation to combine these two together. The result may look like—TP: "Method=INVITE" AND ("String=17323351127 IN RURI").

SPTs may include those points in the SIP signaling on which Filter Criteria can be set. In one implementation, the following SPTs may be defined: any initial known or unknown SIP method (e.g. REGISTER, INVITE, SUBSCRIBE, MESSAGE); presence or absence of any header field; content of any header field or Request-URI; direction of the request; session description information; etc. SPTs in packet telephony may be associated and mapped to the classic Intelligent Network-Capabilities Set 2 (IN-CS2) Originating and Terminating Setup, Busy, RNA and Disconnect events. Thus, SPTs may be defined based on IN-CS2 events.

Filter Criteria may include initial Filter Criteria (iFC) and subsequent Filter Criteria (sFC). The iFC may trigger one or more SPTs to send the received request to one specific application server. The set of Filter Criteria that is stored for a service profile of a specific subscriber may be called "Application Server Subscription Information." In order to allow S-CSCF 102/SCIM 103 to handle the different Filter Criteria in the correct sequence, a priority may be assigned to each of the criteria. Execution rules may determine application invocation with potential support for application server precedence, resolution of conflicts between applications, management of exceptions when things do not go as planned or thresholds are exceeded, placement of constraints, and work within the context of the session request. Filter Criteria can take into account any information embedded in the SIP message including, for example, the RURI, Header Content, Message Body, the UserID, the Method, and Session Description Protocol (SDP) content. The SIP Message may affect the dynamic behavior of the filtering.

The sFC may include filter criteria that are signaled from an Application Server to S-CSCF 102. sFC may allow for dynamic definition of the relevant SPTs at application execution time.

Figure 5:
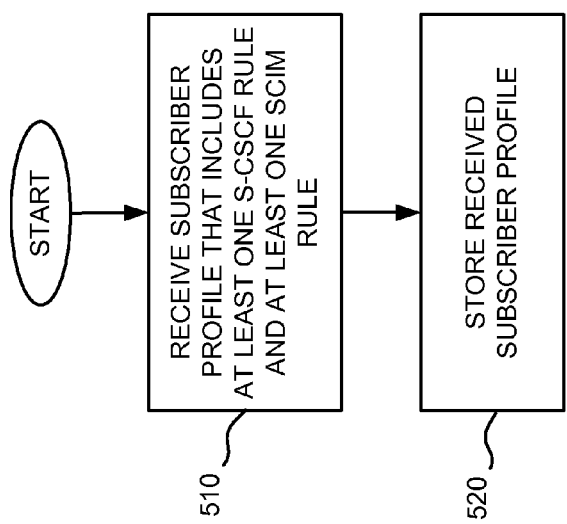
FIG. 5 illustrates a flow chart of exemplary processing for storing a subscriber profile consistent with an exemplary implementation.

FIG. 5 is a flowchart of an exemplary process for storing subscriber profiles in an exemplary implementation. The processing described in FIG. 5 may be implemented by S-CSCF 102. Processing may begin with S-CSCF 102 receiving a subscriber profile (block 510). S-CSCF 102 may receive the subscriber profile automatically or in response to an action by S-CSCF 102 (e.g., in response to a request from S-CSCF 102 for the subscriber profile). S-CSCF 102 may, for example, receive the subscriber profile when a subscriber registers with the IMS. S-CSCF 102 may alternatively receive the subscriber profile when a call request is received (e.g., in those situations when the IMS user is unregistered).

The subscriber profile may include the information described above with respect to FIG. 3. In one implementation, the subscriber profile may include at least one S-CSCF 102 rule for invoking one or more macro applications and at least one SCIM 103 rule for invoking one or more micro applications.

S-CSCF 102 may store the received subscriber profile (block 520). For example, S-CSCF 102 may store the subscriber profile in database 400 (FIG. 4).

Figure 6:
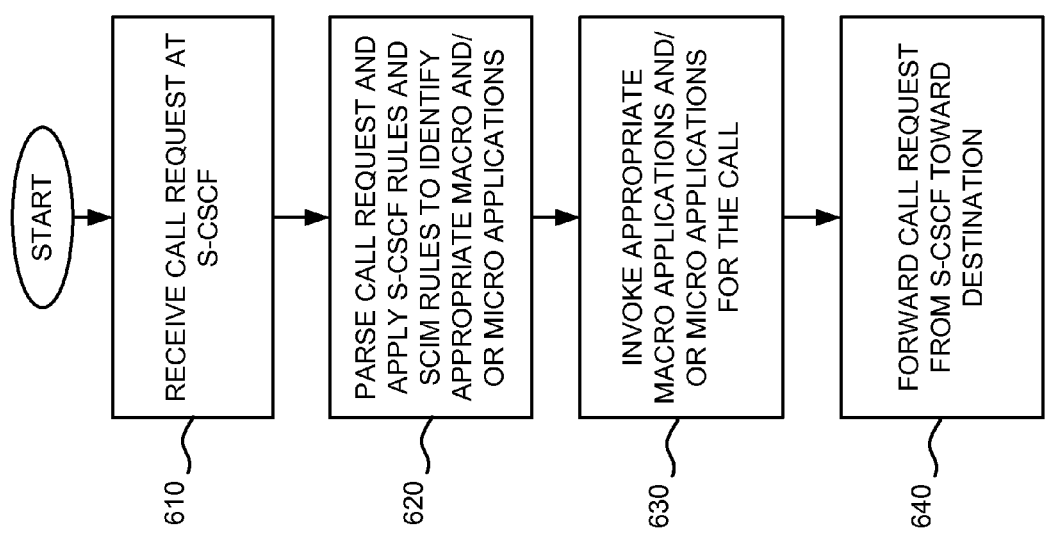
FIG. 6 illustrates a flow chart of exemplary call handling processing in an exemplary implementation.

FIG. 6 is a flowchart of an exemplary call handling processing in an exemplary implementation. The processing described in FIG. 6 may be performed by S-CSCF 102/SCIM 103. Processing may begin with S-CSCF 102 receiving a call request (block 610). The call request may include, for example, a SIP request, such as a SIP INVITE request. S-CSCF 102 may receive the call request from another device in the IMS, such as P-CSCF 106.

S-CSCF 102 may parse the received call request (block 620). For example, S-CSCF 102 may parse the call request to identify information in the header of the message and/or body of the request. In one implementation, S-CSCF 102 may identify the destination party for the call request. S-CSCF 102 may use the destination party's identity to obtain a subscriber profile associated with the destination party's identity. If the destination party is a registered subscriber, S-CSCF 102 may use the destination party's identity to obtain a subscriber profile from database 400. If the destination party is an unregistered user, S-CSCF 102 may use the destination party's identity to obtain a subscriber profile from HSS 108.

S-CSCF 102/SCIM 103 may apply S-CSCF rules and SCIM rules in the obtained subscriber profile to identify the appropriate macro and/or micro application(s) to be invoked for the received call request (block 620). As set forth above, the subscriber profile may include filter criteria that may be used to determine the service(s) to be chained when a trigger point is invoked.

S-CSCF 102/SCIM 103 may invoke the appropriate macro application(s) and/or micro application(s) for the call request (block 630). As indicated above, a macro application may include an IP-Centrex (or another service provided by a stand-alone application server) and a micro application may include a Find-Me function, a Do-Not-Disturb function, a voicemail function, a location function, etc. S-CSCF 102/SCIM 103 may invoke the appropriate macro application(s) and/or micro application(s) by transferring the call request to the appropriate application server(s).

S-CSCF 102 may forward the call request toward the appropriate destination (block 640). For example, S-CSCF 102 may forward the call to P-CSCF 106, BGCF 120, or I-SBC 150 for completing the call. Once the call is established, S-CSCF 102/SCIM 103 may monitor the call to detect any mid-call triggers that might invoke additional macro applications and/or micro applications.

Figure 7:
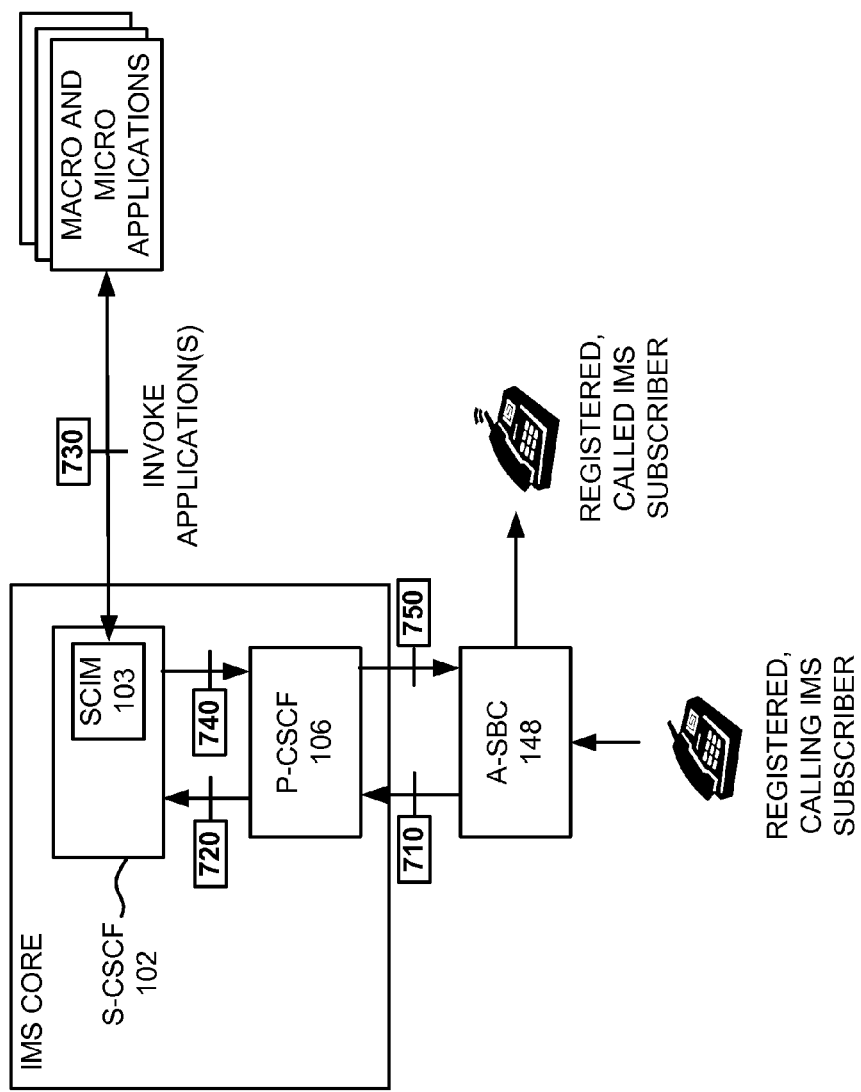
FIG. 7 illustrates an example of the processing described with respect to FIG. 6.

FIG. 7 shows an example of the processing described above with respect to FIG. 6. As illustrated in FIG. 7, assume that a registered calling IMS subscriber (also called a "calling subscriber") places a call to registered called IMS subscriber (also called a "called subscriber"). In response to placing the call, a call request may be transferred to the A-SBC 148 with which the calling subscriber is associated. A-SBC 148 may transfer the call request to the appropriate P-CSCF 106 of the IMS core (block 710). P-CSCF 106 may transfer the call request to the appropriate S-CSCF 102 with which the called subscriber is associated (block 720). In response to receiving the call request, S-CSCF 102 may parse the call request. S-CSCF 102 may obtain a subscriber profile for the called subscriber based on information from the call request (e.g., information identifying the called subscriber). If the called subscriber is registered with S-CSCF 102, S-CSCF 102 may obtain the subscriber profile from database 400. If, on the other hand, the called subscriber is not registered with this particular S-CSCF 102, S-CSCF 102 may obtain a subscriber profile for the called subscriber from HSS 108. In some implementations, S-CSCF 102 may also obtain a subscriber profile for the calling subscriber based on information from the call request (e.g., information identifying the calling subscriber).

S-CSCF 102/SCIM 103 may use the subscriber profiles of the called and/or calling subscribers to identify one or more macro application(s) and/or one or more micro application(s) to invoke for the call request. In this example, assume that the called subscriber's subscriber profile indicates that the called subscriber desires a group of micro application services, such as a Find-Me service, provided by a first application server, and then a voicemail box, provided by a second application server, be applied based upon the service point trigger of a session setup. SCIM 103 may invoke the Find-Me service by sending the call request to the first application server (block 730). The first application server may identify a location for the called party and transmit this information to SCIM 103 (block 730). S-CSCF 102 may forward the call request to the called subscriber in order to establish the call (blocks 740 and 750). If the call cannot be established (e.g., the called subscriber does not accept the call request), SCIM 103 may invoke the called subscriber's voicemail box. If, on the other hand, the call is established (e.g., by the called subscriber accepting the call request), S-CSCF 102/SCIM 103 may monitor the on-going call and invoke the appropriate macro application(s) and/or micro application(s) that may be triggered during the call.

Implementations described herein relate to placing a SCIM within an S-CSCF of an IMS.

The foregoing description of exemplary implementations provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 5-7, the order of the acts may be varied in other implementations. Moreover, non-dependent acts may be implemented in parallel.

Embodiments of the invention, as described above, may be implemented in many different forms of software, firmware, and hardware. The actual software code or specialized control hardware used to implement embodiments of the invention is not limiting of the invention. Thus, the operation and behavior of embodiments were described without reference to the specific software code—it being understood that design software and control hardware may be designed to implement embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
identifying, using a Serving-Call Session Control Function (S-CSCF), a party of a message;
obtaining, using the S-CSCF and based on the identified party, a profile of the party,
the obtained profile including:
a first rule to invoke a macro application,
a second rule to invoke a micro application, and
information identifying an order for invoking the macro application and the micro application;
invoking, using the S-CSCF and based on the first rule, the macro application; and
invoking, using the S-CSCF and based on the second rule, the micro application,
the micro application and the macro application being invoked in an order that is based on the information identifying the order for invoking the macro application and the micro application.

2. The method of claim 1, further comprising:
detecting, based on the obtained profile, a trigger associated with the message; and
invoking, based on the obtained profile and the detected trigger, a second micro application.

3. The method of claim 1, where the message corresponds to a session initiation protocol (SIP) message,
the method further comprising:
parsing the SIP message to identify information in at least one of a header or a body of the SIP message,
where obtaining the profile comprises obtaining, based on the information in the at least one of the header or the body of the SIP message, the profile.

4. The method of claim 1, where invoking the macro application comprises:
transferring the message to a first device associated with the macro application, and
where invoking the micro application comprises:
transferring the message to a second device associated with the micro application.

5. The method of claim 1, further comprising:
detecting a trigger associated with the message;
identifying, based on the detected trigger, a second macro application and a second micro application; and
invoking the identified second macro application and the identified second micro application in an order that is based on the obtained profile.

6. The method of claim 1, further comprising:
obtaining, based on a second message, a second profile, where the obtained second profile includes a third rule to invoke a second macro application; and
invoking, based on the third rule, the second macro application.

7. The method of claim 6, where obtaining the second profile comprises:
obtaining, based on identification information of a sender of the second message, the second profile.

8. A device comprising:
a memory to store instructions; and
a processor, to execute the instructions in the memory, to:
receive a call request,
obtain, based on the received call request, a user profile, the obtained user profile including:
a Serving-Call Session Control Function (S-CSCF) rule to invoke a first application,
a Service Capability Interaction Manager (SCIM) rule to invoke a second application different than the first application, and
information identifying an order for invoking the first application and the second application,
invoke, using the S-CSCF rule included in the obtained user profile, the first application for the received call request, and
invoke, using the SCIM rule included in the obtained user profile, the second application for the received call request,
the first application and the second application being invoked based on the order identified in the obtained user profile.

9. The device of claim 8, where, when obtaining the user profile, the processor is to:
parse the received call request, and
obtain, based on parsing the received call request, the user profile.

10. The device of claim 8, where the received call request corresponds to a session initiation protocol (SIP) request, and where the processor is to:
parse the SIP request to identify information in at least one of a header or a body of the SIP request,
where, when obtaining the user profile, the processor is to obtain, based on the information identified in at least one of a header or a body of the SIP request, the user profile.

11. The device of claim 8, where the obtained user profile further includes a second S-CSCF rule,
where the processor is further to:
identify, based on the second S-CSCF rule, a third application, and
invoke, using the second S-CSCF rule, the identified third application for the received call request.

12. The device of claim 8, where, when a call, associated with the received call request, is established, the processor is further to:
detect a trigger during the established call, and
invoke, based on detecting the trigger and based on the obtained user profile, a third application.

13. The device of claim 8, where the second application includes at least one of a voicemail function or a location function, and
where, when invoking the second application for the received call request, the processor is to:
invoke the at least one of the voicemail function or the location function for the received call request.

14. The device of claim 8, where, when invoking the first application for the received call request, the processor is to:
transfer the received call request to a device associated with the first application,
receive information from the device associated with the first application, and
forward, based on the received information, the received call request to a called party.

15. A non-transitory computer-readable medium for storing instructions, the instructions comprising:
a plurality of instructions which, when executed by a device, cause the device to:
receive a call request;
obtain, based on the received call request, a user profile, the obtained user profile including:
a Serving-Call Session Control Function (S-CSCF) rule to invoke a first application, a Service Capability Interaction Manager (SCIM) rule to invoke a second application different than the first application, and
information identifying an order for invoking the first application and the second application;
invoke, using the S-CSCF rule included in the obtained user profile, the first application for the received call request; and
invoke, using the SCIM rule included in the obtained user profile, the second application for the received call request,
the first application and the second application being invoked based on the order identified in the obtained user profile.

16. The non-transitory computer-readable medium of claim 15, where one or more instructions, of the plurality of instructions, to obtain the user profile, include:
one or more instructions to parse the received call request; and
one or more instructions to obtain, based on parsing the received call request, the user profile.

17. The non-transitory computer-readable medium of claim 15, where the received call request corresponds to a session initiation protocol (SIP) request, and
where the instructions further comprise:
one or more instructions to parse the SIP request to identify information in at least one of a header or a body of the SIP request,
where one or more instructions, of the plurality of instructions, to obtain the user profile, include one or more instructions to obtain, based on the information in the at least one of the header or the body of the SIP request, the user profile.

18. The non-transitory computer-readable medium of claim 15, where the obtained user profile further includes a second S-CSCF rule, and
where the instructions further comprise:
one or more instructions to identify, based on the second S-CSCF rule, a third application; and
one or more instructions to invoke, using the second S-CSCF rule, the third application for the received call request.

19. The non-transitory computer-readable medium of claim 15, the instructions further comprising:
one or more instructions to detect, when a call is established, a trigger during the call,
the call being associated with the received call request; and
one or more instructions to invoke, based on detecting the trigger and based on the obtained user profile, a third application.

20. The non-transitory computer-readable medium of claim 15, where the second application includes at least one of a voicemail function or a location function, and
where one or more instructions, of the plurality of instructions, to invoke the second application for the received call request include:
one or more instructions to invoke the at least one of the voicemail function or the location function for the received call request.

\* \* \* \* \*